(12) United States Patent
Kim et al.

(10) Patent No.: US 11,904,900 B2
(45) Date of Patent: Feb. 20, 2024

(54) AUTONOMOUS VEHICLE FOR BLIND PEOPLE

(71) Applicants: HYUNDAI MOTOR COMPANY, Seoul (KR); KIA MOTORS CORPORATION, Seoul (KR)

(72) Inventors: Sam Yong Kim, Gyeonggi-do (KR); Seong Sook Ryu, Seoul (KR); Byoung Joon Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 808 days.

(21) Appl. No.: 16/869,926

(22) Filed: May 8, 2020

(65) Prior Publication Data
US 2021/0179148 A1    Jun. 17, 2021

(30) Foreign Application Priority Data
Dec. 16, 2019    (KR) .......................... 10-2019-0167674

(51) Int. Cl.
*H04W 4/44* (2018.01)
*B60W 60/00* (2020.01)
*G06V 40/16* (2022.01)

(52) U.S. Cl.
CPC ..... *B60W 60/00253* (2020.02); *G06V 40/172* (2022.01); *H04W 4/44* (2018.02)

(58) Field of Classification Search
CPC . B60W 60/00253; H04W 4/44; G06V 40/172
See application file for complete search history.

(56) References Cited

U.S. PATENT DOCUMENTS

2020/0019761 A1*    1/2020  Kang .................. G06V 40/172

* cited by examiner

*Primary Examiner* — Charles J Han
(74) *Attorney, Agent, or Firm* — MORGAN, LEWIS & BOCKIUS LLP

(57) ABSTRACT

An autonomous vehicle for blind people is provided. The autonomous vehicle includes a riding and alighting point search device that searches for a riding point at which a user will ride and an alighting point at which the user will alight, in response to call information received from a terminal of the user, a passenger recognition device that recognizes the user who will ride in the vehicle at the riding point, and an autonomous driving controller that controls an autonomous driving operation of the vehicle.

18 Claims, 5 Drawing Sheets

AUTONOMOUS VEHICLE FOR BLIND PEOPLE

CROSS-REFERENCE TO RELATED APPLICATION

The present application is based on and claims the benefit of priority to Korean Patent Application No. 10-2019-0167674, filed on Dec. 16, 2019 in the Korean Intellectual Property Office, the entire disclosure of which is incorporated herein by reference.

TECHNICAL FIELD

The present disclosure relates to an autonomous vehicle for blind people, and more particularly, relates to technologies of allowing a blind person to safely use a vehicle.

BACKGROUND

For safety and convenience of users who use vehicles, various sensors and devices are provided in the vehicle and functions of the vehicle are diversified. The functions of the vehicle may be divided into a convenience function for ensuring convenience of drivers and a safety function for ensuring safety of drivers and/or pedestrians.

Herein, the convenience function is motivated to develop driver convenience of, for example, assigning an infotainment function to the vehicle, supporting a partial autonomous driving function, or helping the driver to see at night or at blind spot. For example, the convenience function may be an active cruise control (ACC), smart parking assist system (SPAS), night vision (NV), head up display (HUD), around view monitor (AVM), adaptive headlight system (AHS), or the like.

The safety function may be a technology for ensuring safety of a driver and/or safety of a pedestrian, which is line departure warning system (LDWS), lane keeping assist system (LKAS), autonomous emergency braking (AEB), or the like.

To support and increase the functions of the vehicle, an autonomous vehicle capable of automatically driving to a destination without intervention of the driver has been developed. Autonomous driving is defined as at least one of acceleration, deceleration, and a driving direction is controlled by a predetermined algorithm although a driving manipulation device is not manipulated by the driver.

Various algorithms associated with the autonomous driving have been developed. However, research has been actively conducted in an autonomous vehicle capable of automatically responding to a situation which occurs outside the vehicle, whereas research is still insufficient in an autonomous vehicle considering passengers who ride in the vehicle.

For example, when the taxi is replaced with the autonomous vehicle, because an entity (or a taxi driver) who operates the taxi disappears, there may be problems about whether the autonomous vehicle allows any guest to ride, when the autonomous vehicle starts to drive, or how the autonomous vehicle handles a passenger when the vehicle breaks down. Particularly, when the customer who rides in the taxi is a disabled person (e.g., a blind person), convenience of the passenger should be more considered.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides an autonomous vehicle for blind people to improve convenience and safety of a passenger, when a blind person rides in the vehicle, when the vehicle is traveling, or when the blind person alights from the vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an autonomous vehicle for blind people may include: a riding and alighting point search device that searches for a riding point at which a user will ride and an alighting point at which the user will alight, in response to call information received from a terminal of the user, a passenger recognition device that recognizes the user who will ride in the vehicle at the riding point, and an autonomous driving controller that controls an autonomous driving operation of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
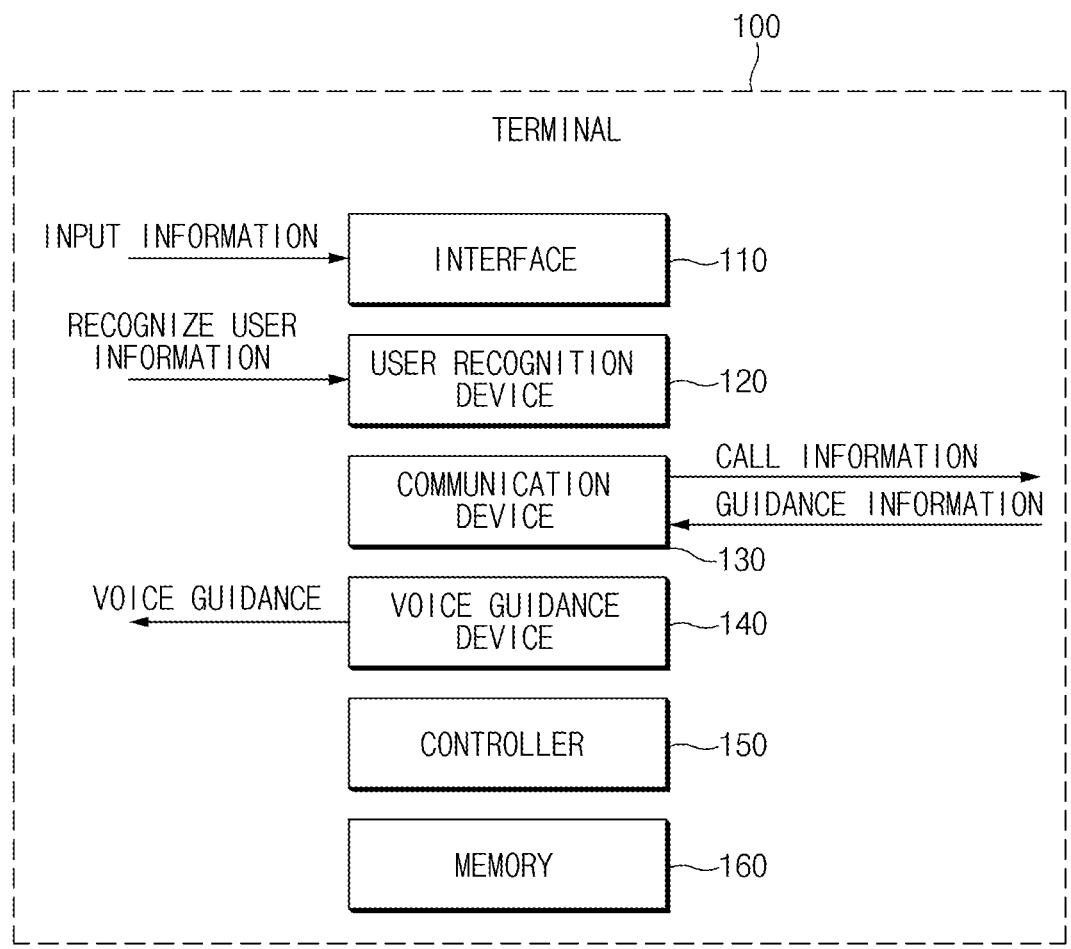
FIG. 1 is a block diagram illustrating a configuration of a terminal which communicates with an autonomous vehicle for blind people according to an exemplary embodiment of the present disclosure.

Hereinafter, a description will be given in detail of exemplary embodiments disclosed in the specification with reference to the accompanying drawings, and the same or similar reference denotations are assigned to the same or similar components without regard to the drawing denotations, a duplicated description thereof will be omitted.

The suffix "device" of components used in the description below is assigned and used interchangeably with regard to only ease of writing the specification, and does not have any distinguishable meanings or functions. Furthermore, when it is determined that a detailed description of the related well-known technology blurs the gist of exemplary embodiments disclosed in the specification in describing exemplary embodiments, a detailed description thereof will be omitted.

Furthermore, the accompanying drawings are merely disclosed to easily understand exemplary embodiments disclosed in the specification, and the technical scope disclosed in the specification is not limited by the accompanying drawings. It is should be understood that the technical scope disclosed in the specification includes changes, equivalents, or substitutes included in the spirit and scope of the prevent disclosure and the technical scope.

The expression of singular number includes the expression of plural number unless clearly intending otherwise in a context. In the specification, it should be understood that terms of 'comprise' and the like are to designate the existence of a feature disclosed in the specification, a numeral, a step, an input, a constituent element, a part, or a combination thereof, and do not previously exclude a possibility of existence or supplement of one or more other features, numerals, steps, inputs, constituent elements, parts, or combinations thereof.

The vehicle described in the specification may be the concept of including all of an internal combustion engine vehicle having an engine as the power source, a hybrid vehicle having an engine and an electric motor as the power sources, and an electric vehicle having an electric motor as the power source.

FIG. 1 is a block diagram illustrating a configuration of a terminal 100 which communicates with an autonomous vehicle for blind people according to an exemplary embodiment of the present disclosure.

Referring to FIG. 1, the terminal 100 according to an exemplary embodiment of the present disclosure may include an interface 110, a user recognition device 120, a communication device 130, a voice guidance device 140, a controller 150, and a memory 160.

Herein, the terminal 100 may be a terminal for blind people. Such a terminal for blind people may be any one of portable mobile communication means including a smartphone, a personal digital assistant (PDA), a laptop, a netbook, and the like.

The interface 110 may receive input information from a user. For example, the interface 110 may receive input information for calling a vehicle 200 of FIG. 2 from the user.

The user recognition device 120 may recognize user information. For example, the user recognition device 120 may recognize face information in body information of the user. According to an exemplary embodiment, the user recognition device 120 may recognize appearance information of the user. To this end, the user recognition device 120 may include a sensor or a camera for recognizing information of the user.

The communication device 130 of the terminal 100 may transmit call information to the vehicle 200. Herein, the call information may include the user information recognized through the user recognition device 120, location information of the terminal 100, or destination information. For example, the user may set software for mobile communication or a communication number in the terminal 100 to simply call the vehicle 200 via the communication device 130.

The communication device 130 may receive guidance information from the autonomous vehicle 200. Herein, the guidance information may include a riding point of the vehicle 200, a sitting location, an alighting point, driving information, autonomous driving mode information, or the like.

The voice guidance device 140 may provide a voice guidance service to the user. The controller 150 may control an overall operation of the interface 110, the user recognition device 120, the communication device 130, the voice recognition device 140, and the memory 160.

For example, when the user inputs user information through the interface 110, the controller 150 may provide voice guidance via the voice guidance device 140 such that face information or appearance information of the user are clearly identified. In other words, the controller 150 may provide voice guidance capable of guiding the user to a location and direction of the terminal 100 (e.g., a mobile terminal, a smartphone, etc.) through the voice guidance device 140.

Furthermore, the controller 150 may guide the user to a riding point of the vehicle 200 through the voice guidance device 140. Furthermore, when the user moves to the riding point to ride in the vehicle 200, the controller 150 may determine whether the user correctly move to a destination and may guide the user to the destination through the voice guidance device 140. When the called vehicle 200 arrives at the riding location, the controller 150 may notify the user of a method for riding in the vehicle 200 using a voice through the voice recognition device 140.

The memory 160 may store all of information controlled by the controller 150. For example, the memory 160 may store input information of the user, face information of the user, appearance information of the user, location information, riding history information, riding vehicle information, call information, or the like.

Figure 2:
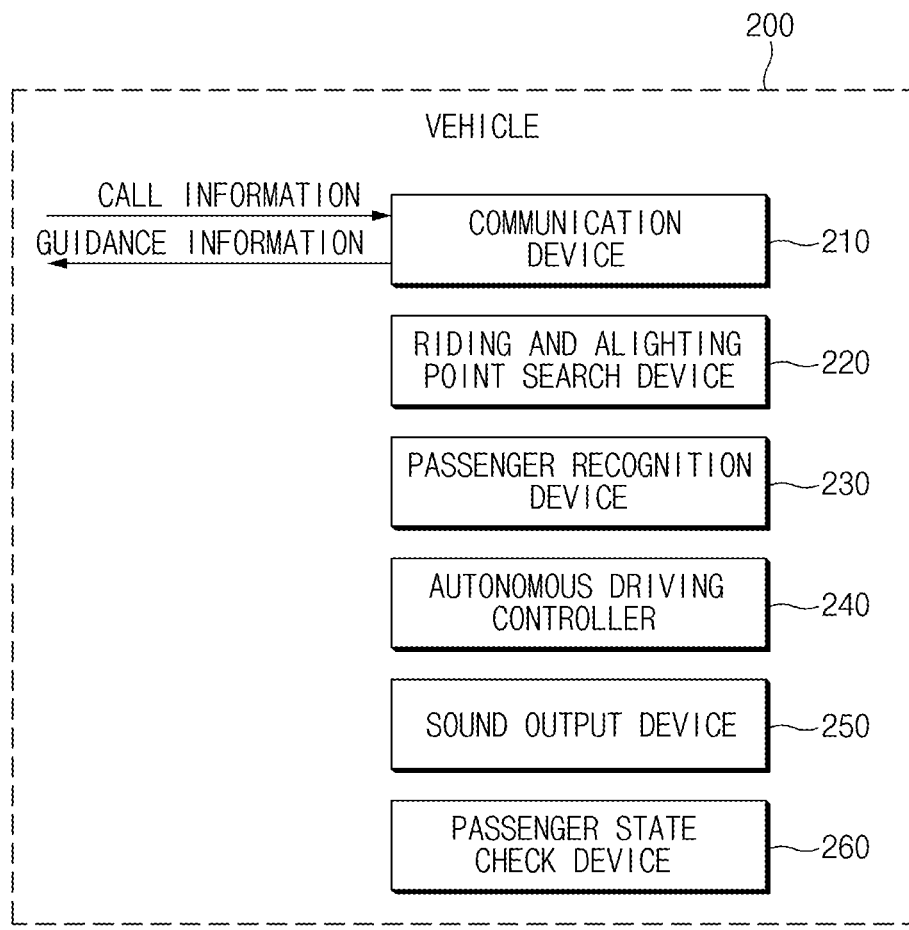
FIG. 2 is a block diagram illustrating a configuration of an autonomous vehicle for blind people according to an exemplary embodiment of the present disclosure.

FIG. 2 is a block diagram illustrating a configuration of an autonomous vehicle for blind people according to an exemplary embodiment of the present disclosure. The "vehicle" in an exemplary embodiment of the present disclosure may indicate that an autonomous vehicle is used as a taxi. Furthermore, an embodiment of the present disclosure is exemplified as a user (i.e., a subscriber) directly calls a vehicle 200. However, according to an exemplary embodiment, the user may call the vehicle 200 through a server.

Referring to FIG. 2, the vehicle 200 according to an exemplary embodiment of the present disclosure may include a communication device 210, a riding and alighting point search device 220, a passenger recognition device 230, an autonomous driving controller 240, a sound output device 250, and a passenger state check device 260.

Herein, the communication device 210 of the vehicle 200 may receive call information from a terminal 100 of FIG. 1. Herein, the call information may include user information, that is, face information of a user, appearance information of the user, or the like, location information of the terminal 100, and destination information of the user. When the user rides in the vehicle 200, while the vehicle 200 is traveling, and when the user alights from the vehicle 200, the communication device 210 may transmit guidance information to the terminal 100.

According to an exemplary embodiment of the present disclosure, the communication devices 130 and 210 may be a hardware device implemented by various electronic circuits to transmit and receive signals via wireless or wired connections.

The riding and alighting point search device 220 of the vehicle 200 may be an electric circuitry (e.g., a processor) that executes instructions of software which thereby performs various functions described hereinafter.

The riding and alighting point search device 220 may search for a riding point at which the user will ride, based on a distance between a call point and a riding point depending on the call information received from the terminal 100. The riding and alighting point search device 220 may first recommend an optimum riding point among the found several riding points based on the distance between the call point and the riding point, whether there is an obstacle, or the like.

Furthermore, when the vehicle 200 arrives near a destination of the user, the riding and alighting point search device 220 may monitor the periphery of the vehicle 200 and may search for alight points where the passenger (which is the user) will alight. When the passenger alights from the vehicle 200, the riding and alighting point search device 220 may first recommend an optimum alighting point among the found several alighting points to the passenger based on a distance from the alighting point to the destination of the user, whether there is an obstacle, or the like.

When the vehicle 200 arrives at the riding point, the passenger recognition device 230 may search for passenger candidates who will ride in the vehicle 200, depending on location information of the user terminal 100 which calls the vehicle 200 and user information. For example, the passenger recognition device 230 may capture the periphery of the vehicle 200 using a camera for surround view monitor (SVM) or a light detection and ranging (LiDAR) sensor to obtain an image. Herein, the camera for SVM may include a front and rear view camera, a right view camera, and a left view camera.

The autonomous driving controller 240 of the vehicle 200 may control an autonomous driving operation of the vehicle 200. The autonomous driving controller 240 may automatically generate a current location and a nearby map. For example, the autonomous driving controller 240 may generate a detailed movement route using simultaneous localization and map building (SLAM). The autonomous driving controller 240 may recognize a location of the vehicle 200 using a map of a surrounding environment, or, conversely, may recognize the location of the vehicle 200 and may build a map of a corresponding area. Furthermore, the autonomous driving controller 240 may perform both of localization and map building at the same time. When the vehicle 200 moves in an area where an SLAM map is generated, the autonomous driving controller 240 may extract a key frame, a landmark, or the like from an image obtained from the camera and may compare the extracted key frame, landmark, or the like with a key frame, landmark, or the like of a previously generated map to recognize a location of the vehicle 200.

The autonomous driving controller 240 according to an exemplary embodiment of the present disclosure may be a processor (e.g., computer, microprocessor, CPU, ASIC, circuitry, logic circuits, etc.). The autonomous driving controller 240 may be implemented by a non-transitory memory storing, e.g., a program(s), software instructions reproducing algorithms, etc., which, when executed, controls operations of various components of the vehicle 200, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

When the user rides in the vehicle 200, the sound output device 250 may transmit a guidance sound such that the passenger may determine whether the passenger rides in the vehicle 200. The sound output device 250 may transmit driving information and autonomous driving mode information while the vehicle 200 is traveling to provide a service to the passenger. When the vehicle 200 arrives at a destination, the sound output device 250 may play back a guidance sound such that the passenger may identify an alighting point.

The passenger state check device 260 of the vehicle 200 may be an electric circuitry (e.g., a processor) that executes instructions of software which thereby performs various functions described hereinafter.

The passenger state check device 260 may recognize a location and motion of the passenger who rides in the vehicle 200, and may minutely notify the passenger of a sitting location of the passenger in the vehicle 200 through the sound output device 250. In other words, the passenger state check device 260 may compare a predetermined sitting location when the passenger rides in the vehicle 200 with a current location of the passenger to determine a movement direction and a movement distance of the passenger. The passenger state check device 260 may be implemented as a driver state warning (DSW) system.

Furthermore, the passenger state check device 260 may recognize a state (e.g., intention) of the passenger who rides in the vehicle 200 and may transmit information associated with autonomous driving. The passenger state check device 260 may recognize a state of the passenger who rides in the vehicle 200 and may control to change an autonomous driving mode.

Figure 3:
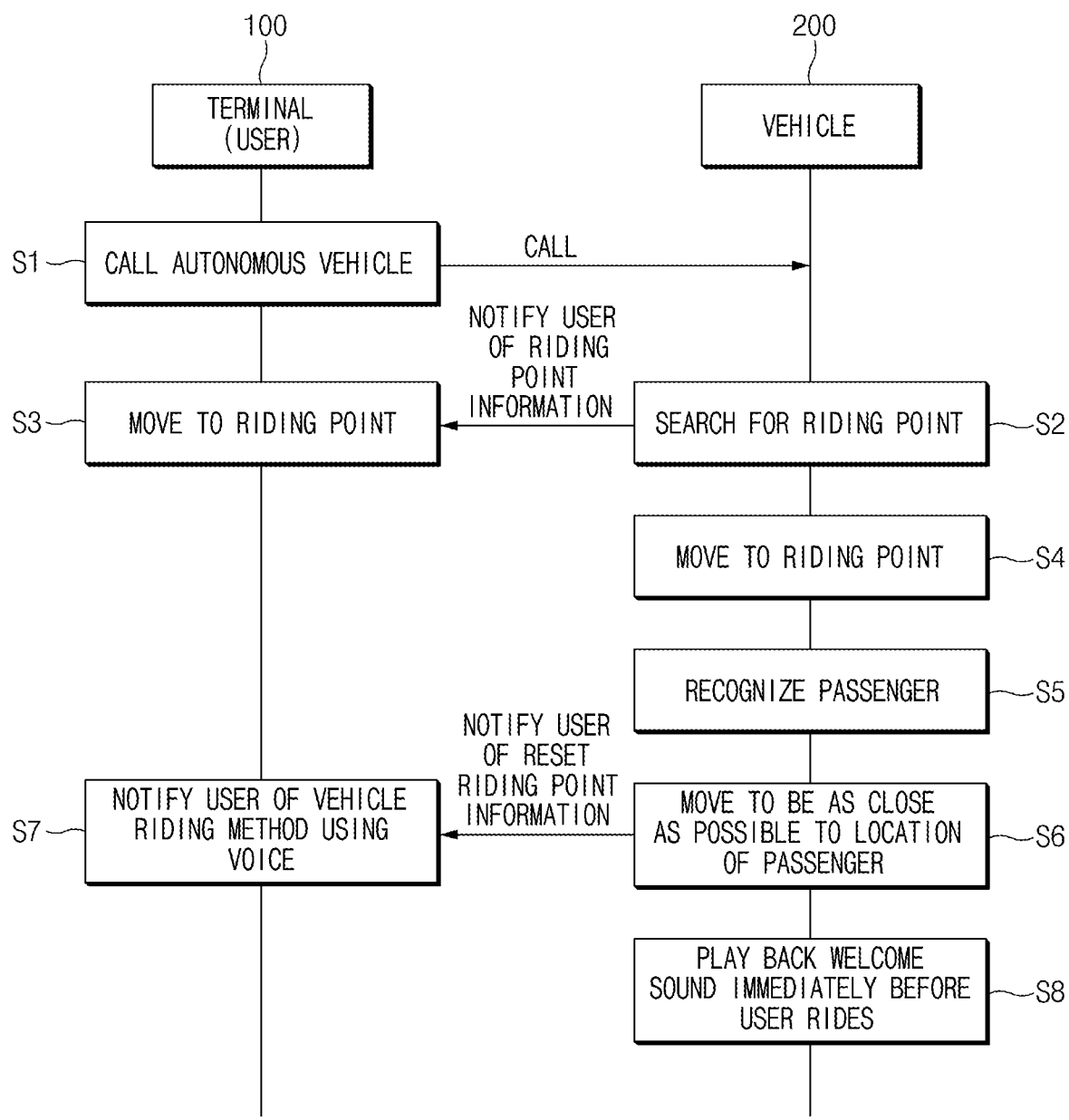
FIG. 3 is a signal sequence diagram illustrating an operation at which a user rides in an autonomous vehicle for blind people, according to an exemplary embodiment of the present disclosure.

FIG. 3 is a signal sequence diagram illustrating an operation where a user rides in an autonomous vehicle for blind people, according to an exemplary embodiment of the present disclosure.

Referring to FIG. 3, a user who wants to use a vehicle 200 may input information for calling the vehicle 200 using a terminal 100 he or she carries. For example, the user may simply manipulate a braille button or may input voice information "call the vehicle", through an interface 110 of the terminal 100.

Thereafter, the user may allow a user recognition device 120 of FIG. 1 to recognize his or her face information or appearance information. In S1, a communication device 130 of FIG. 1 may transmit call information including location information of the terminal 100, destination information, and the user information recognized by the user recognition device 120 to the vehicle 200 to call the vehicle 200.

For example, when the user who downloads software for smartphone executes the software, the communication device 130 may perform manipulation which calling is automatically performed. Alternatively, when the user registers a simple-digit number as a call number and makes a call to the number, the communication device 130 may automatically perform communication.

Next, a communication device 210 of FIG. 2 may receive the call information from the terminal 100. In S2, a riding and alighting point search device 220 of FIG. 2 may search for the nearest distance from a call point depending on location information of the terminal 100 in the call information received from the terminal 100. The riding and alighting point search device 220 may search for a riding point at which the user will ride, based on a distance from the call point to the riding point.

For example, the riding and alighting point search device 220 may search whether there are stairs, obstacles, crosswalks, or the like on a route between the call point and the riding point and may recommend riding points with priorities. The riding and alighting point search device 220 may select a route which has the least stairs, obstacles, and crosswalks among several routes between the call point and the riding point to recommend a riding point.

Thereafter, the communication device 210 may transmit guidance information including riding point information of the vehicle 200 to the communication device 130. In other words, the communication device 210 may transmit guidance information of the riding point recommended by the riding and alighting point search device 220 to the terminal 100.

In S3, the user may receive the riding point guidance information via the terminal 100 and may move to the guided riding point.

Herein, a controller 150 of the terminal 100 may guide the user to the riding point via the voice guidance device 140 of FIG. 1. Furthermore, when the user moves to the riding point, the controller 150 may determine whether the user moves to a correct route and may notify the user of the determined result via the voice guidance device 140. Furthermore, when the user arrives at the guided riding point, the controller 150 may transmit a guidance message for providing a notification that the user arrives at the destination, via the voice guidance device 140.

In S4, an autonomous driving controller 240 of FIG. 2 may move the vehicle 200 to the riding point recommended by the riding and alighting point search device 220.

Thereafter, when the vehicle 200 arrives at the riding point, a passenger recognition device 230 of FIG. 2 may search for passenger candidates who will ride in the vehicle 200 in response to a location of the terminal 100 which calls the vehicle 200 and user information. In other words, the passenger recognition device 230 may capture the periphery of the vehicle 200 using an image sensor (e.g., a camera, etc.) outside the vehicle 200 or a LiDAR sensor and may recognize the user near the vehicle 200.

For example, the passenger recognition device 230 may compare the user information received from the terminal 100 with the captured image to recognize a passenger. When face information or appearance information of the user, received from the terminal 100, is identical to the user captured as the image, in S5, the passenger recognition device 230 may recognize the user as a targeted passenger.

The passenger recognition device 230 may reflect a location of the targeted passenger and a door location of the vehicle 200 to update an accurate riding location and may reset a destination of the vehicle 200. In S6, the autonomous driving controller 240 may move the vehicle to be as close as possible to the location of the targeted passenger.

Thereafter, the communication device 210 may transmit the reset riding point to the terminal 100. When the reset riding point information is received from the communication device 210, the controller 150 may notify the user of whether a point where the user is currently located is the reset riding point, through the voice guidance device 140.

When the vehicle 200 is close near the passenger, the passenger recognition device 230 may recognize a location of the passenger using a sensor outside the vehicle 200. When the vehicle 200 arrives at the riding point, in S7, the controller 150 may notify the user of a relative location of a door using a voice to assist the user to ride in the vehicle 200. In S8, the sound output device 250 may play back a welcome sound at a time when the user rides in the vehicle 200 (immediately before the user rides in the vehicle 200) to notify the user that it is possible to ride in the vehicle 200.

Figure 4:
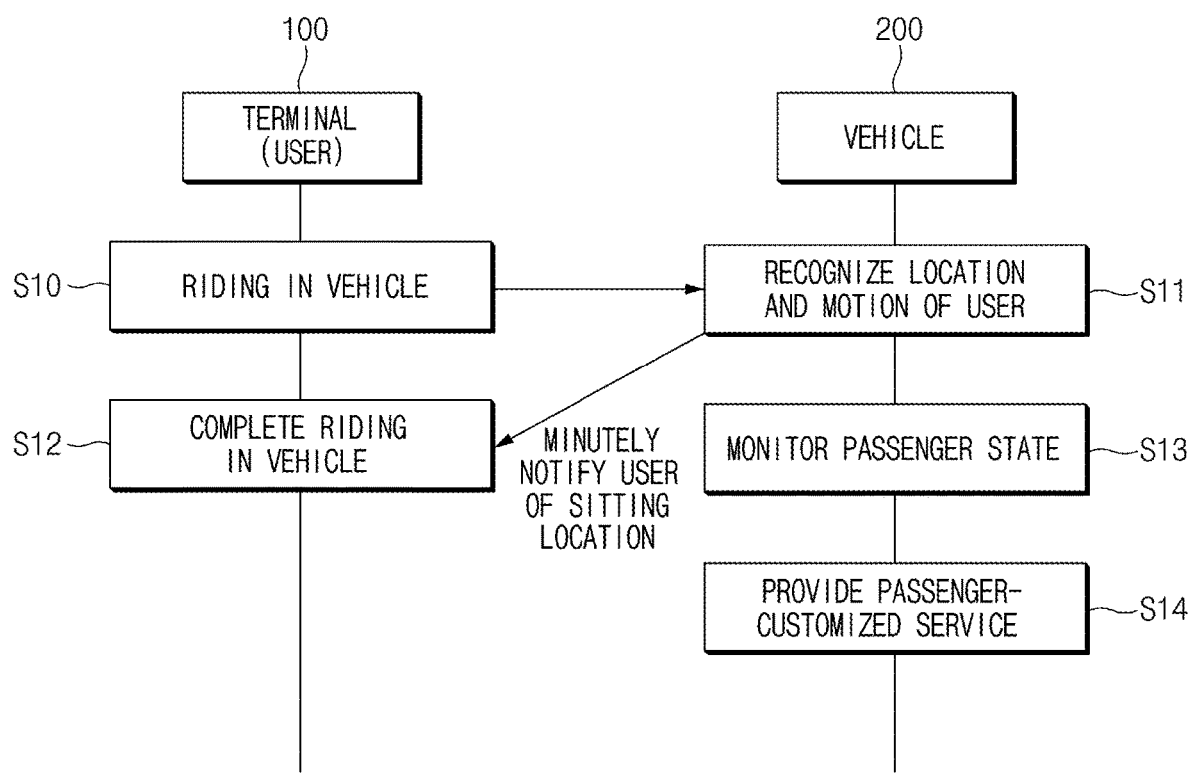
FIG. 4 is a signal sequence diagram illustrating an operation by which an autonomous vehicle for blind people is traveling, according to an exemplary embodiment of the present disclosure.

FIG. 4 is a signal sequence diagram illustrating an operation where an autonomous vehicle for blind people is traveling, according to an exemplary embodiment of the present disclosure.

Referring to FIG. 4, when a user is riding in a vehicle 200 in S10, in S11, a passenger state check device 260 of FIG. 2 may check a state of the user who rides in the vehicle 200.

When the user rides in the vehicle 200, the passenger state check device 260 may recognize a location and motion of the passenger using an indoor camera and may determine a sitting location where the passenger will be sitting. A sound output device 250 of FIG. 2 (e.g., a speaker, etc.) may notify the user of the movement direction and the movement distance, determined by the passenger state check device 260, using a voice.

Thereafter, when the passenger completes correctly riding at the sitting location of the vehicle 200 in S12, the passenger state check device 260 may deliver departure information indicating that the vehicle 200 is able to depart for a destination to an autonomous driving controller 240 of FIG. 2.

While the vehicle 200 moves to the destination under control of the autonomous driving controller 240, in S13, the passenger state check device 260 may monitor a state of the passenger. In S14, the passenger state check device 260 may provide a passenger-customized service to the passenger.

In other words, the passenger state check device 260 may recognize a state of the passenger using the indoor camera and may deliver information associated with driving or may change an autonomous driving mode. Herein, the state of the passenger may include a face direction, an expression, gesture information, or the like of the passenger.

For example, when the passenger looks outside, the passenger state check device 260 may recognize that the passenger is curious about the surrounding landscape. Thus, the passenger state check device 260 may analyze a location and speed of the vehicle 200 on a road recognized by the vehicle 200, a location of a pedestrian, or the like. The passenger state check device 260 may explain an external situation using a voice through a sound output device 250 of FIG. 2 such that the passenger may understand a surrounding situation.

As another exemplary embodiment, when the passenger bows down, looking around, and moving his or her hands, the passenger state check device 260 may recognize that the passenger is looking for something. Thus, the passenger state check device 260 may notify the passenger of locations of objects around the passenger using the sound output device 250.

As another exemplary embodiment, when the passenger frowns, the passenger state check device 260 may recognize that the sense of riding is not good and may change an autonomous mode. When an autonomous driving mode change signal is applied from the passenger state check device 260, the autonomous driving controller 240 may reduce a speed of the vehicle 200 and may keep a lane to travel.

As another exemplary embodiment, when it is quiet around the vehicle 200 and when a passenger keeps awake, the passenger state check device 260 may recognize that the current situation is a situation capable of experiencing driving the vehicle 200. In this case, the passenger state check device 260 may change the autonomous mode to a mode in which the passenger is able to directly drive the vehicle 200.

Figure 5:
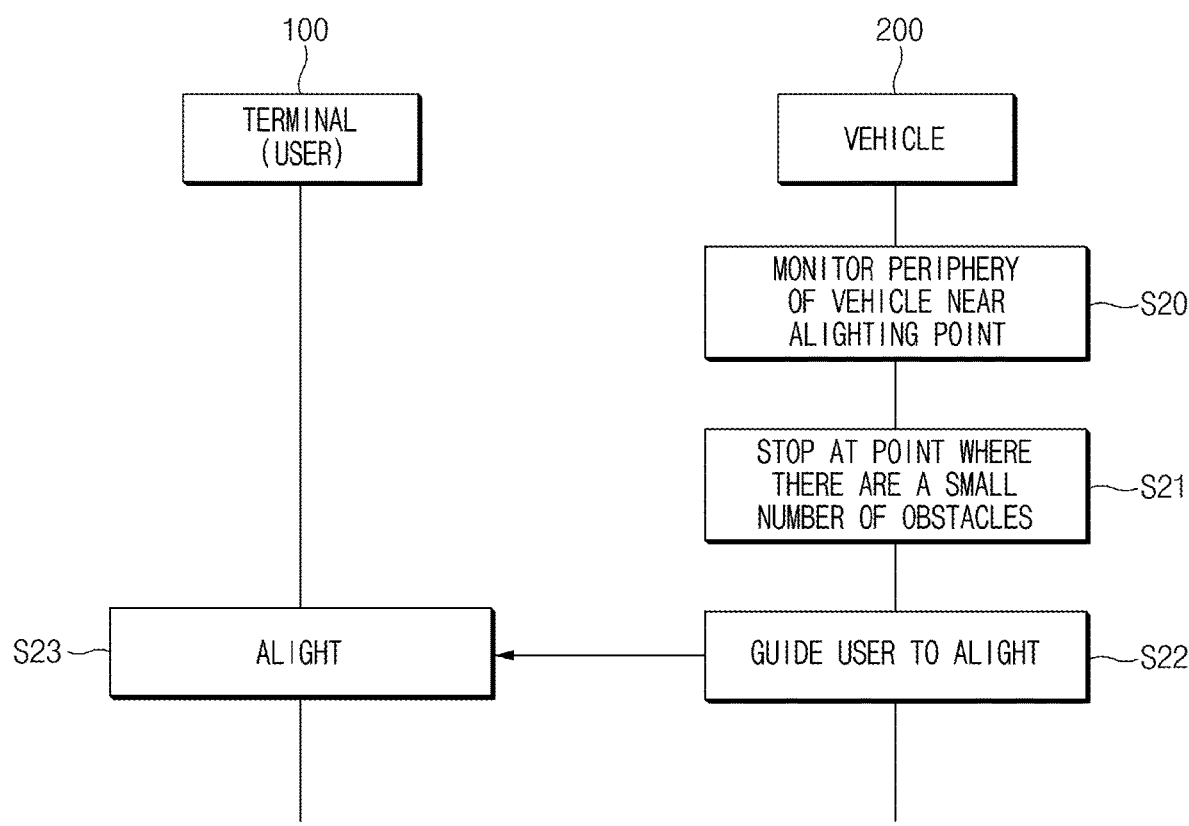
FIG. 5 is a signal sequence diagram illustrating an operation by which a user alights from an autonomous vehicle for blind people, according to an exemplary embodiment of the present disclosure.

FIG. 5 is a signal sequence diagram illustrating an operation where a user alights from an autonomous vehicle for blind people, according to an exemplary embodiment of the present disclosure.

Referring to FIG. 5, when a vehicle 200 arrives near a destination of the user, in S20, a riding and alighting point search device 220 of FIG. 2 may monitor the periphery of the vehicle 200 near an alighting point.

Furthermore, when the vehicle 200 arrives near the destination, the riding and alighting point search device 220 may monitor the periphery of the vehicle 200 and may search for alighting points where a passenger will alight. The riding and alighting point search device 220 may set a point where a distance from the destination is close and where there are a small number of obstacles among the found several alighting points as the alighting point.

In S21, the autonomous driving controller 240 may move the vehicle 200 to the alighting point recommend by the riding and alighting point search device 220. When the vehicle 200 arrives at the alighting point, in S22, the autonomous driving controller 240 may notify the passenger of a guidance message indicating that the passenger should alight because the vehicle 200 arrives at the destination, using a voice through a sound output device 250 of FIG. 2. In S23, the passenger may listen to the guidance message notified through the sound output device 250 and may safely alight at the alighting point.

The above exemplary embodiments of the present disclosure may improve convenience and safety of a passenger, when a blind person rides in the vehicle, when the vehicle is traveling, or when the blind person alights from the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed on the basis of the accompanying claims, and all the technical ideas within the scope equivalent to the claims should be included in the scope of the present disclosure.

What is claimed is:

1. An autonomous vehicle comprising:
    a riding and alighting point search processor configured to search for a riding point at which a user will ride and an alighting point at which the user will alight, in response to call information received from a terminal of the user;
    a passenger recognition processor configured to recognize the user who will ride in the vehicle at the riding point; and
    an autonomous driving controller configured to control an autonomous driving operation of the vehicle; and
    a passenger state check processor configured to:
    recognize a location and a motion of the user who rides in the vehicle,
    guide the user to a sitting location at which the user will be sitting when the user rides in the vehicle,
    compare the sitting location in the vehicle with a current location of the user, and
    determine a distance from the current location of the user to the sitting location in the vehicle and a direction from the current location of the user to the sitting location in the vehicle.

2. The autonomous vehicle of claim 1, wherein the riding and alighting point search processor recommends the riding point in response to information about at least one of a distance from a call point to the riding point, whether there is an obstacle, or whether there is a crosswalk.

3. The autonomous vehicle of claim 1, wherein the riding and alighting point search processor monitors a periphery of the alighting point and searches for the alighting point.

4. The autonomous vehicle of claim 1, wherein the riding and alighting point search processor searches for the alighting point in response to information about at least one of a distance from the alighting point to a destination of the user or whether there is an obstacle.

5. The autonomous vehicle of claim 1, wherein the call information includes at least one of user information received from the terminal, location information of the terminal, or destination information of the user.

6. The autonomous vehicle of claim 5, wherein the user information includes at least one of face information of the user or appearance information of the user.

7. The autonomous vehicle of claim 1, wherein the passenger recognition processor recognizes the user using at least one of a camera intended for surround view monitor (SVM) or a light detection and ranging (LiDAR) sensor.

8. The autonomous vehicle of claim 1, wherein the passenger recognition processor compares user information received from the terminal with a captured image and recognizes the user as a targeted user when the user information is identical to the captured image.

9. The autonomous vehicle of claim 1, wherein the passenger recognition processor updates the riding point by reflecting a location of the user and a door location of the vehicle when the user is recognized and resets a destination of the vehicle.

10. The autonomous vehicle of claim 1, wherein the autonomous driving controller generates a movement route using a simultaneous localization and map building (SLAM).

11. The autonomous vehicle of claim 1, wherein the passenger state check processor delivers departure information to the autonomous driving controller, when the user completes riding at the sitting location at which the user will be sitting in the vehicle.

12. The autonomous vehicle of claim 1, wherein the passenger state check processor recognizes a state of the user while the vehicle is traveling, and delivers information associated with driving.

13. The autonomous vehicle of claim 1, wherein the passenger state check processor recognizes a state of the user while the vehicle is traveling, and controls to change an autonomous driving mode.

14. The autonomous vehicle of claim 13, wherein the state of the user includes at least one of a face direction, an expression, or gesture information of the user.

15. The autonomous vehicle of claim 1, wherein the passenger state check processor includes a driver state warning system.

16. The autonomous vehicle of claim 1, further comprising:
    a communication processor configured to receive the call information from the terminal and transmit guidance information to the terminal.

17. The autonomous vehicle of claim 16, wherein the guidance information includes at least one of a riding point, an alighting point, or a sitting location.

18. The autonomous vehicle of claim 1, further comprising:
    a sound output processor configured to transmit a guidance sound to the user.

\* \* \* \* \*